United States Patent [19]

Bocciarelli

[11] 3,997,651
[45] Dec. 14, 1976

[54] CATALYST MATERIAL, METHOD OF PREPARATION THEREOF, AND METHOD AND APPARATUS USING SAME

[76] Inventor: Carlo V. Bocciarelli, 1329 Lombard St., Philadelphia, Pa. 19147

[22] Filed: July 10, 1974

[21] Appl. No.: 486,985

Related U.S. Application Data

[62] Division of Ser. No. 335,588, Feb. 26, 1973, abandoned.

[52] U.S. Cl. .......................... 423/213.2; 252/462; 75/173 R
[51] Int. Cl.$^2$ ........................................ B01D 53/00
[58] Field of Search ............ 423/212, 213.2, 213.5; 252/462; 75/173 R

[56] References Cited

UNITED STATES PATENTS

| | | | |
|---|---|---|---|
| 1,871,117 | 8/1932 | Day | 252/462 X |
| 3,545,917 | 12/1970 | Stephens | 423/213.2 |
| 3,565,574 | 2/1971 | Kearby | 423/213.2 |
| 3,840,471 | 10/1974 | Acres | 423/213.5 |
| 3,849,342 | 11/1974 | Santala | 423/213.2 X |

OTHER PUBLICATIONS

"Chemical Abstracts;" vol. 62; 1965; p. 1116a.

Primary Examiner—G. O. Peters
Attorney, Agent, or Firm—Howson and Howson

[57] ABSTRACT

A new catalyst material of high activity, low cost, good chemical and physical stability and low activation temperature, consisting essentially of lanthanum distributed in elemental form in a carrier material, for example lanthanum alloyed with silver to form a solid solution. The catalyst material is preferably prepared by forming a melt of lanthanum and the carrier material, and then forming a solid alloy thereof by spin-casting techniques. The catalyst is effective where the catalytic action requires either the positive or the negative ionization of other materials, and especially where both positive and negative ionization are to be produced. The catalyst may be used as a substitute for platinum catalyst, generally with superior performance, and particularly so when used in the treatment of engine exhaust gases to decrease the output of carbon monoxide and nitrogen oxides. It is also useful as a catalyst at one or both of the electrodes in a fuel cell, as the catalyst in heterogeneous catalysis of materials to form chemical compounds therefrom or as a catalyst for catalytic cracking of petrochemicals. As a catalyst for the reduction of oxides of nitrogen it is especially effective, operates at very low temperatures compared with platinum, and is many times less expensive.

3 Claims, 2 Drawing Figures

CATALYST MATERIAL, METHOD OF PREPARATION THEREOF, AND METHOD AND APPARATUS USING SAME

This application is a division of my U.S. patent application Ser. No. 335,588, filed Feb. 26, 1973, now abandoned.

BACKGROUND OF THE INVENTION

This invention relates to a new catalyst material, to methods of preparing the same, and to methods and apparatus using it. In one of its preferred forms, the invention relates to new catalyst materials suitable for promoting chemical reactions, especially such reactions for which platinum has previously been used as the catalyst.

Catalyst materials are known in the prior art which affect certain chemical reactions in a desired way without themselves being used up or substantially modified during the process. Among the primary desirable attributes of such a catalyst are high catalytic activity at an appropriate temperature, relatively low cost, easy availability and plentiful supply. Heretofore platinum has been considered the best catalyst material for many purposes from the viewpoint of catalytic activity, but it is very expensive and in limited supply. Furthermore, even greater catalytic activity than is provided by platinum would, of course, also be desirable. Among the many applications in which such catalysts are useful are in catalytic cracking processes, as the catalyst at one or more of the electrodes in a fuel cell, as a catalyst for facilitating the synthesizing of various chemical compounds, as the catalyst for facilitating certain general types of oxidizing and/or reducing chemical reactions, and as a catalyst for promoting certain purifying or pollution-reducing chemical reactions, for example in converting the pollutive substances in engine exhausts to less harmful materials.

In the auto exhaust field the need and the search for an effective yet inexpensive catalyst have been particularly intense. Government specifications for permissive levels of emission of carbon monoxide and oxides of nitrogen will require the use of emission-reducing equipment in automobiles, and to the present time it appears that even though such equipment is used the design and/or adjustment of automobile engines will nevertheless have to be modified in a manner to reduce engine-efficiency and power. Accordingly, an effective and inexpensive exhaust catalyzer is desirable not only to reduce the size and cost of the catalyzer but also to widen the permissible range of engine designs and adjustments.

There is a wide variety of substances and combinations of substances which have been proposed for use as catalysts, primarily in an effort to avoid the excessive costs of platinum, and while such are usable for certain purposes, the degree of the catalytic activity is often less than would be desired. Combinations of platinum with other materials have also been proposed, primarily to further increase the activity of the platinum and to some degree to reduce the cost of the combination below that of platinum alone. For example, palladium has been used for the latter purpose, but the catalytic activity obtained still leaves room for improvements. In all of these catalyst materials, chemical and/or physical stability of the catalyst is also of importance in many applications. Thus a catalyst material which is easily dissolved or otherwise readily displaced, or which readily reacts chemically with other materials to form new compounds, or which readily breaks down into different materials, clearly is not desirable in many commercial applications.

The temperature at which the catalyst is effective is also important in many cases. Thus if the catalyst only becomes active at temperature above the lower end of the range in which it is intended to operate, or if it loses its activity or becomes physically or chemically unstable at temperatures including those at which it is intended to operate, it clearly will not be of most utility for its intended purpose.

One recently proposed catalyst is disclosed in my U.S. Pat. No. 3,511,714, issued May 12, 1970 and entitled "Chemical Source of Electrical Current, Catalyst Suitable for Use Therein and Method for the Manufacturing Thereof" which describes the use as a catalyst of various stoichiometric ordered alloys of certain noble metals, doped with minor amounts of certain metals for enhancing the electron-donating capabilities of the alloy. Such materials are useful, for example, at the electron-donating electrode of a fuel cell, but their performance is less than desired in applications where electron acceptance is the desired catalytic mechanism, as at the electron-accepting electrode of a fuel cell. Similarly, such materials are not as effective as desired for heterogeneous catalysis because their electron-accepting capabilities are not as great as would be desired for such purposes. Also, such materials are not as effective as is desirable in reducing certain pollutants such as oxides of nitrogen in engine exhaust.

In the article entitled "Rare Earth Oxides of Cobalt Rival Platinum in Treatment of Carbon Monoxide in Auto Exhausts", by Voorhoeve et al. and appearing in volume 177, page 353 of the 28 July 1972 periodical *Science*, various catalytic compounds are disclosed and compared with platinum for efficiency as catalysts in decreasing carbon monoxide in auto exhaust emissions. For example, Table 1 of the latter article shows results obtained with platinum catalysts in comparison with catalysts comprising various rare-earth oxides in the form of crushed single crystals.

Despite the very extensive work which has been done in the field of catalysts, for the purposes mentioned above and for other purposes, there still remains room for improvement with respect to catalytic activity, physical and chemical stability, and low price, and particularly so for catalysts to be used in reducing the pollutants in engine exhausts.

Accordingly it is an object of the invention to provide a new and useful catalyst material.

Another object is to provide such a catalyst which exhibits improved catalytic activity.

Another object is to provide such a catalyst which can be produced economically.

A further object is to provide a new catalyst for reducing nitrogen oxides and/or oxidizing carbon monoxide which is effective even at relatively low temperatures.

A further object is to provide a new catalyst of a high degree of effectiveness in converting oxides of nitrogen in engine exhausts to less harmful materials.

A further object is to provide a new catalyst which is effective in reducing the quantity of carbon monoxide in engine exhausts.

A further object is to provide a catalyst material having more than one component, the composition and proportions of which material can be adjusted during preparation to provide a desired operating temperature range for the catalyst, a suitable cost for the catalyst material, and a suitable degree of chemical and physical stability for the particular application.

It is also an object to provide a new method of making a catalyst material.

A further object is to provide a new catalyst suitable for use at one or more of the electrodes in a fuel cell.

Another object is to provide a new catalyst for catalytic cracking of petrochemicals.

Another object is to provide a new catalyst for facilitating synthesizing reactions between gaseous substances.

A further object is to provide a new catalyst suitable for catalyzing both oxidizing and reducing reactions for materials applied thereto.

It is also an object to provide new apparatus for reducing the pollutive emissions from engine exhaust.

Another object is to provide a new fuel cell and electrodes for use therein.

Another object is to provide a new catalyst effective as a substitute for platinum catalyst.

SUMMARY OF THE INVENTION

These and other objects of the invention are achieved by the provision of a catalyst material comprising a carrier metal and elemental lanthanum distributed in said carrier material; particularly for the purpose of decreasing the quantity of pollutive components in engine exhaust emissions, as well as for other purposes, the carrier material is silver and the lanthanum is alloyed therewith to form a solid solution. Preferably also, the lanthanum comprises a minor part of the catalyst material, while the carrier material comprises the major part of the catalyst material; suitably the mole ratio of the lanthanum to the silver is from about 4:96 to about 24:76 and preferably it is between about 4:96 and 12:88. In preferred configurations at least one dimension of the catalyst material is extremely small, e.g. of the order of tens of microns or less, and the catalyst is preferably a spin-cast ribbon or filament.

According to the method of the invention, lanthanum is distributed in the carrier metal by alloying, and the resultant solid body of material is preferably formed in a configuration to provide a large surface-to-volume ratio, preferably by spin-casting.

For the purposes of engine-exhaust emission control, preferably an assemblage of fine ribbons or filaments of the catalyst material of the invention is placed in the path of the emission, for example at or within the conduit through which the exhaust gas is passed to the environment. When used to convert CO to $CO_2$, excess air is preferably admitted with the CO.

For use as the catalyst at one or more electrodes of a fuel cell, the catalyst material may be ground to a fine powder and applied in known ways to the supporting electrode structure. For use in other heterogeneous catalysis processes, the material may be formed in a powder as in the case of the fuel cell electrodes, or it may be used in fine filamentary form or in other known configurations, depending upon the particular application thereof.

In one preferred form, the catalyst material in the form of fine filaments of silver alloyed with a minor amount of lanthanum is placed in an engine exhaust system so as to be impinged by the engine exhaust gases, including carbon monoxide and oxides of nitrogen such as nitric oxide, the percentage of lanthanum in the catalyst material being of the order of 9%, thereby to produce extremely efficient chemical conversion of the carbon monoxide and harmful nitrogen oxides to less harmful materials, typically carbon dioxide and nitrogen.

The catalysts of the invention are capable of high catalytic activity even at relatively low temperatures and, specifically, high conversion efficiency when used to convert carbon monoxide and nitrogen oxides to less harmful substances, yet can be made inexpensively and in physically and chemically stable forms.

While not wishing to be bound by the details of any specific theory, the catalyst of the invention was conceived on the basis of considerations such as the following, which are believed to be correct. The catalytic capabilites of a material are determined primarily by the ease with which it can donate to and/or accept electrons from other materials. Some catalyzed reactions require donation of electrons, some require acceptance of electrons, and some require both. Higher valence metals in which the outermost or near-outermost electrons are loosely bound to the nucleus tend to exhibit the capability of donating electrons easily; elements having incompletely-filled inner electron levels or shells tend more readily to accept electrons. Platinum exhibits both of these two characteristics to a substantial degree, and hence is active as a catalyst in a variety of different types of reactions. Lanthanum is chemically trivalent, and hence donates electrons quite readily; it also possesses a large number of electron vacancies, or unfilled positions, in its inner electron shells, particularly the 4F and 5d shells. The latter shells are also very dense, and small electron excitations can move an electron up or down between adjacent shells or levels. Lanthanum therefore has the inherent capability of acting as a ready acceptor of electrons.

I have in fact found that, at least in certain applications, lanthanum is capable of substantially greater catalytic activity than is platinum. However, these inherent catalytic capabilites of lanthanum can be masked, or greatly reduced, if the metal is combined with other elements in strongly bonded compounds. Further, while lanthanum may be used by itself as a catalyst without a carrier, the fact that the atoms of the metal are then close together again tends to produce atomic interactions reducing their catalytic effectiveness, as compared to when they are distributed in another material or carrier so that the atoms are spaced further apart, and in addition lanthanum by itself or in large concentrations tends to form oxides at its surface. However, when lanthanum is distributed through silver by alloying therewith, and the lanthanum is a minor constituent of the alloy, the spaced-apart lanthanum atoms are able to exert their inherent catalytic capabilities to a maximum degree. In addition when, as in the case of silver, the carrier forms a solid solution with the lanthanum, the lanthanum is particularly effective as a catalyst, yet the complete cataylst consisting of the lanthanum and silver exhibits desirable physical and chemical stability in most applications.

The spin-casting method preferably employed to make the catalyst of the invention may be like that described, for example, in U.S. Pat. No. 2,825,108, of R. B. Pond, issued Mar. 4, 1958 and entitled "Metallic Filaments and Method of Making Same".

BRIEF DESCRIPTION OF FIGURES

The objects and features of the invention may be more readily understood from the following detailed description, taken with the accompanying drawings, in which.

DETAILED DESCRIPTION OF PREFERRED EMBODIMENTS

Figure 1:
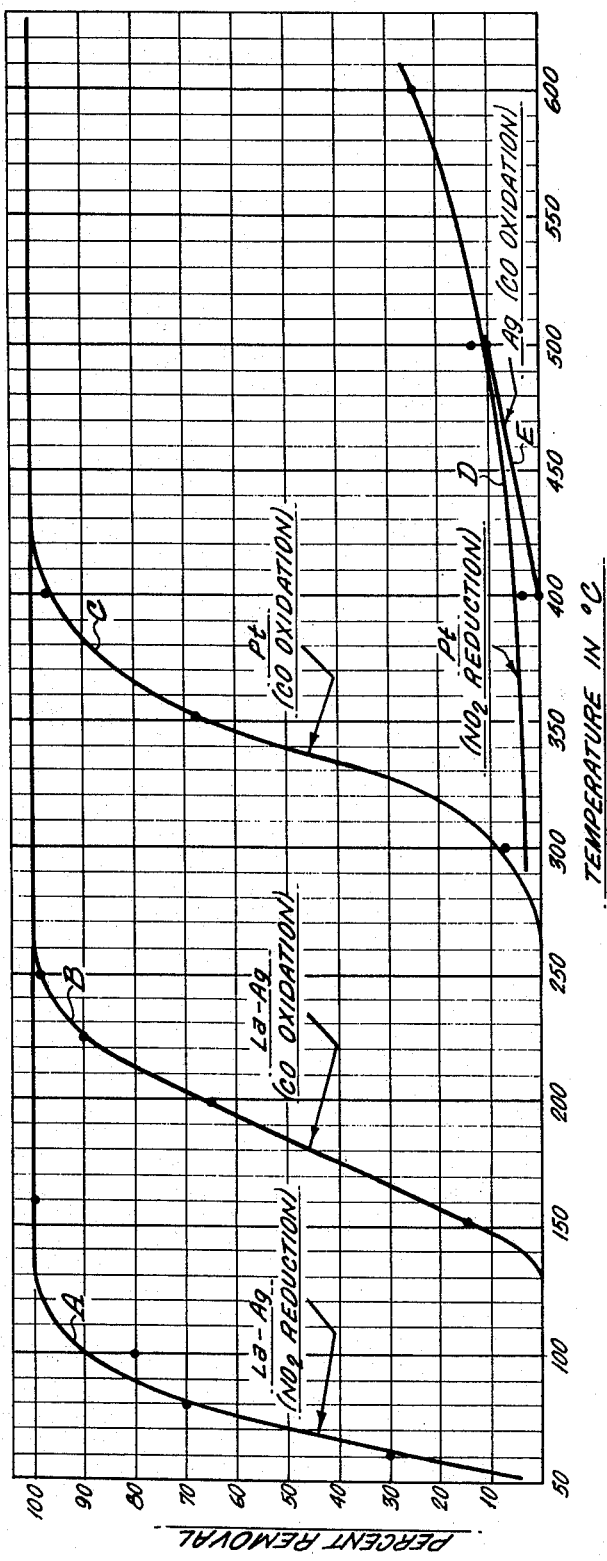
FIG. 1 is a graphical representation comparing performance of the catalyst of the invention with certain other known catalysts for the oxidation of CO and the reduction of $NO_2$.

As an example of a method for fabricating the catalyst of the invention, a spin-casting apparatus generally similar to that described in the above-mentioned U.S. Pat. No. 2,825,108 may be provided, including a cylindrical carbon crucible with a surrounding heater. The top of the crucible is threaded to provide for an inlet through which pressurized argon may be admitted. The bottom of the crucible is provided with a nozzle having a small opening, for example 10 to 15 mils in diameter, for discharge of a stream of molten material from the crucible. The discharge area may be flooded with nitrogen to minimize oxidation of the discharged material.

The crucible is first flushed with argon, and silver placed in the crucible with lanthanum. For example, 100 grams of silver and 10 grams of lanthanum may be placed in the crucible, and heated by operation of the heater in the argon atomsphere to form a melt, for example at a temperature of about 1000° C. The high surface tension of the molten metal normally prevents the metal from flowing through the orifice unless pressure is applied to the molten metal.

Beneath the discharge orifice is located the rotating element of the spin-casting machine. The rotating element is typically a disc of polished copper, maintained cold (for example at about 25° C when impinged by the metal) by applying water jets to the under side of the disc. The disc is rotated at about 3400 r.p.m. or more. Superatmospheric pressure, for example 15 pounds per square inch above atmospheric pressure, is applied to the argon gas above the molten metal to force it through the nozzle in a fine stream directed against the top of the rotating disc off center of its axis of rotation. The molten metal contacts the disc for a part of a revolution, is thereby rapidly cooled to solid form, and thrown off before a complete revolution. The entire volume containing the jet and disc top surface may be flooded with an inert gas to minimize oxidation. By suitable adjustment of temperatures, nozzle orifice size, gas pressure and disc speed, the solid alloy of silver and lanthanum can readily be caused to leave the disc surface in long thin strips or ribbons. Typically the ribbon may have a thickness of about 30 microns or even much less, and a width for example between about 1/8 and 1/16 inch.

To test the resultant catalyst material, a loosely compacted wad of the ribbon catalyst is placed in a 2-inch diameter iron pipe; the wad may be held in a cylinder having wide-mesh screens at each end to confine and position the ribbon within the pipe. Gases to be treated are passed from a common source to a collecting and measuring chamber, either by way of the pipe containing the catalyst or alternately by way of a bypass containing no catalyst. In this way a comparison is obtained between the catalytically treated and the untreated gases. A resistance heater around the tube enables controlled variation of the temperature of the catalyst.

In one typical test, 25 grams of the catalyst material of the invention, comprising an alloy of 10 parts of lanthanum to 100 parts of silver prepared by spin-casting as described above, was placed in the testing tube. To test for reduction of oxides of nitrogen, a gas flow rate through the tube was established of about 10 cubic feet per hour of nitrogen containing 50 parts per million of $NO_2$, mixed with CO at a flow rate of about 0.04 cubic feet per hour. The measurement of $NO_2$ remaining after passage through the tube, and after passage through the bypass for comparison purposes, was made by means of standard commercial mine-safety tubes such as those made by Mine Safety Appliance Corporation of Pittsburgh, Pa., which were also used in the measurements for CO. To test for the oxidation of CO, a flow of 9 cubic feet per hour of compressed air mixed with a flow of about 0.015 cubic feet per hour of CO was established through the tube containing the 25 grams of catalyst and compared with the same flow through the bypass. In each case the C, was first raised to about 400° c, and tests made at progressively lower temperatures as the catalyst cooled.

The results of such tests are plotted in FIG. 1 for the case of 100 parts silver to 10 parts by weight lanthanum. Curve A is for $NO_2$ reduction by the catalyst of the invention, and curve B is for CO oxidation by the catalyst of the invention. In FIG. 1 ordinates represent the percent removal of $NO_2$, or CO, by the catalyst, and abscissae represent temperature of the catalyst in degrees Centigrade, and the dots along the curves represent measured values in a typical test. For comparison, curves C and D show the results of tests reported by other laboratories for the oxidation of CO and the reduction of nitrogen oxides, respectively, by a platinum mesh of surface area equivalent to that of the inventive catalyst. Curve E shows reported results for the case of silver of equivalent surface area.

From the graphs it will be seen that for the reduction of $NO_2$ the material of the invention (curve A) is far superior to platinum (curve D). Thus curve A for the La-Ag catalyst shows removal of substantially 100% of the $NO_2$ at temperatures extending upward from less than about 150° C, while platinum has produced only about 25% removal even at 600° C and the curve at this point is still rising quite slowly with increasing temperature. In the case of CO, the La-Ag catalyst of the invention (curve B) has caused removal of substantially 100% of the CO at about 250° C, while platinum does not produce comparable complete removal of CO until the temperature is over 400° C.

Accordingly the Ag-La alloy catalyst of the invention produces vastly improved performance compared to platinum at the lower temperatures, not only for $NO_2$ but also for CO. This ability to perform well at low temperatures is itself important in the reduction of harmful emissions from engine exhausts in providing effective action soon after starting a cold engine. It also is an index of the ability of a given amount of the catalyst to handle relatively heavy concentrations of pollutive gases; thus a substantially smaller amount of Ag-La alloy may be used to provide the same degree of oxidation and/or reduction as would be provided by a much larger amount of platinum.

Calculations indicate in fact that the Ag-La catalyst of the invention is in fact capable of roughly 2.7 times greater conversion efficiency of CO to $CO_2$ than platinum for the same surface area, and roughly 9 times greater conversion efficiency for $NO_2$, assuming that the platinum and the Ag-La are operated at the respective temperatures for which each is most effective. Since it is expected that the cost of the Ag-La catalyst will be of the order of 165 times less than platinum, it is calculated that the Ag-La catalyst will provide the same extend of removal of oxides of nitrogen as does platinum for roughly 1/1500 the cost, and the same extent of removal of CO as platinum at roughly 1/1400 the cost of platinum. The importance of such economy, for example in auto exhaust emission catalyzers, is apparent. Of course at lower temperatures, e.g. less than about 250° C, platinum is nearly completely ineffective and Ag-La is fully effective, and even up to about 600° C, platinum is nearly completely ineffective and Ag-La is fully effective, and even up to about 600° C the Ag-La has a further advantage over platinum of about 4 times more than the 1500 times cost advantage given above. Accordingly, the cost ratios of 1:400 and 1:1500 given above become even more favorable to Ag-La at lower temperatures to an extent dependent upon the particular temperature selected.

Figure 2:
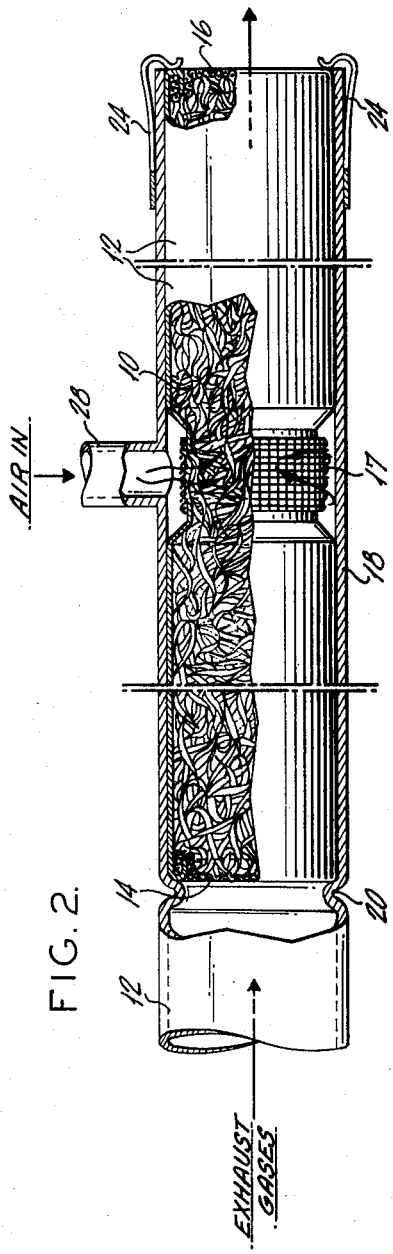
FIG. 2 is a fragmentary side view, with parts broken away, of apparatus using the catalyst of the invention to treat exhaust gases.

FIG. 2 illustrates, by way of example only, a wad 10 of loosely compacted ribbons of the Ag-La catalyst packaged in a replaceable cylindrical container 12 having wide-mesh end screens 14 and 16 and a necked-down portion along the center of its length comprising an annular wide mesh screen 17. Container 12 is positioned in an engine exhaust pipe 18 by means of an inwardly-protruding annular stop surface 20 in the pipe and an arrangement of spring clips 24 at the downstream end of the pipe. The exhaust gases may be from an internal combustion gasoline engine, preferably using low-lead or no-lead gasoline. Also shown is an arrangement 28 for injecting additional air into the container 12 through screen 17 midway of the catalyst, through which air may be forced by a pump or otherwise drawn into container 12 to provide excess air for the downstream portion of the catalyst. Thus the upstream portion will be especially effective to eliminate oxides of nitrogen and the downstream portion supplied with excess air particularly effective to eliminate CO. The air input may be provided by a fan, and, if desired, may provide a variable flow of air capable of adjustment during the useful life of the catalyst. Because of its low temperature capabilities, the Ag-La catalyst will be effective quickly after engine start-up, and can be placed near the exit end of the exhaust system. The cylinder and catalyst can be removed and replaced easily, and the used catalyst recovered and reprocessed.

While the preferred carrier metal for the lanthanum is silver, other materials may be used in applications where they are appropriate, since it is not the catalytic properties of the carrier per se which are most important. This is shown, for example, by curve E in FIG. 1, which shows that the CO-oxidizing ability of silver is vastly inferior to that of Ag-La shown in curve B. The carrier material is therefore generally chosen more for its physical and chemical stability than for its own catalytic properties, which may be appreciable or negligible in any given alloy. For example, nickel, tin or platinum may be used in place of silver, silver however being preferred. Additional inert materials may also be present in quantities not to eliminate the desired catalytic properties.

Also, while the spin-cast alloy of Ag-La is preferred and has been found extremely effective as shown hereinbefore, the alloy of the invention may be made by other alloying methods and preferably formed into thin sheets or powders to provide large surface area per unit weight.

In the example given herein, the alloy consisted of 10 parts pure lanthanum to 100 parts silver by weight. While this ratio is preferred, good performance may be obtained for La to Ag ratios from about 5 to 100 up to about 15 to 100, and useful performance can be expected for ratios between about 5 to 100 and 30 to 100.

While in this example the ranges of La are expressed in terms of parts by weight, calculations indicate that the more significant factor is the number of atoms of carrier per atom of La, especially at the surface, where undesirable oxides can form. Accordingly, in general it is preferred that the mole ratio of La to the carrier material be from about 4:96 to about 12:88, although useful results can be expected for mole ratios up to about 24:76.

Also, the catalyst of the invention may be used as a platinum substitute for enhancing oxidizing reactions alone, or reducing reactions alone, or for various heterogeneous catalytic reactions involving oxidation and reduction simultaneously, including uses in fuel cells and in catalytic cracking of petrochemicals.

Thus while the invention has been described with respect to specific embodiments thereof in the interest of complete definiteness, it may be embodied in a variety of forms diverse from those specifically shown and described without departing from the spirit and scope of the invention as defined by the appended claims.

What is claimed is:

1. A method for decreasing the quantity of CO and $NO_2$ in the exhaust emissions from an engine by reducing $NO_2$ and oxidizing CO, comprising the steps of placing in the path of said emissions a catalyst alloy material consisting essentially of lanthanum distributed in elemental form in a carrier metal of silver, while maintaining said catalyst material at a temperature for which it is catalytically active.

2. The method of claim 1, in which the mole ratio of said lanthanum to said silver is from about 4:96 to about 24:76.

3. The method of claim 1, in which said catalyst material is a spin-cast alloy.

* * * * *